Figure 1:
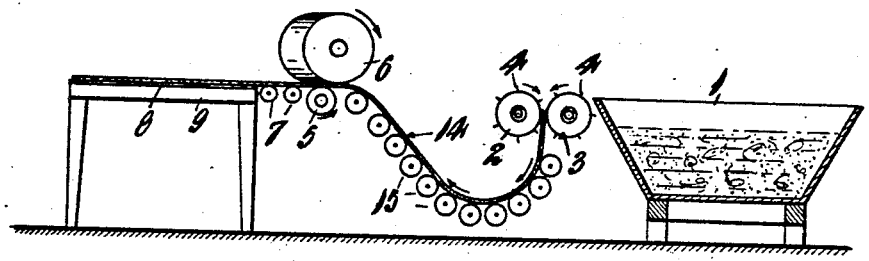

Feb. 13, 1923.

W. DUNSTAN.
CEMENTITIOUS WALL BOARD.
FILED SEPT. 11, 1922.

1,445,204.

Inventor
William Dunstan,
By Henry Orth Jr.
Atty

Patented Feb. 13, 1923.

1,445,204

UNITED STATES PATENT OFFICE.

WILLIAM DUNSTAN, OF VICTORIA, AUSTRALIA.

CEMENTITIOUS WALL BOARD.

Application filed September 11, 1922. Serial No. 587,541.

*To all whom it may concern:*

Be it known that WILLIAM DUNSTAN, a subject of the King of Great Britain, residing at 7 Eveline Street, Brunswick, in the State of Victoria, Commonwealth of Australia, has invented new and useful Improvements in Cementitious Wall Board, of which the following is a specification.

The object of this invention is the production of a cementitious composition capable of being moulded to form various articles or sheets or slabs which while possessing strength and durability will be inexpensive to produce as the constituent materials are natural or unmanufactured products. The invention also includes mechanical means for mixing the composition, feeding and polishing same in sheet form and drying same ready for use.

Another advantage of this invention is that the sheets for instance used for interior or exterior purposes on a building may be readily manufactured on the site and to the exact size required, thus avoiding subsequent cutting, this advantage being possible owing to the simplicity of the apparatus necessary for manufacturing the articles.

A considerable range of material may be used as a basis for the composition, all of which materials are comparatively inexpensive. For instance, the material may consist of clay, marl clay, clay slimes and earth, slimes from mines and crushed residues of ores or slimes from creeks, infusorial earth where lightness is desired, chalk or whiting and any of such materials if not already water soaked, may be mixed together with water, into a stiff plastic condition. In order to reinforce the mixture or material, fibre, hemp, or like material is added and for assisting in the binding and quick drying of the material, petrifying agents such as silicate of soda or calcium chloride previously dissolved may be added or liquid glue and cement.

The sodium silicate in proportion to the clay or slimes may vary from 5% to 25% by weight, but if sodium silicate and calcium chloride are used in conjunction, from 6% to 20% of sodium silicate is used with about 1.5% of calcium chloride.

When the sheets or other articles are subjected to the weather, oxide of iron or other metal oxides may be included in the composition to harden same and also in order to protect the composition while setting, tar, pitch, or resin may be added to the face. According to the degree of hardness required for the composition from 1% to 10% of ferric oxide or other metal oxide is included but some classes of clays or slimes possess sufficient iron and also lime content.

The sheets for outside use may have a skin deep face of cement applied thereto and for double faced sheets, one exposed to the weather and the other forming an interior surface, the outer side is coated with a thin skin of cement and the interior side, with a similar layer of plaster of Paris or like cementitious material.

The sheets or moulded articles are expeditiously dried by artificial heat and do not require to be kiln-dried.

The accompanying drawings illustrate diagrammatically a simple apparatus for use in manufacturing sheets or slabs of the composite material.

Fig. 1 being a general diagram and

Figure 4:
Figure 3:
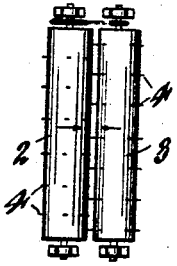
Figure 2:
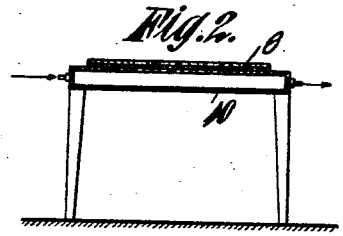

Fig. 2 a vertical section through a drying table;

Figs. 3 and 4 details of rollers shown in Fig. 1, and

Figure 5:

Fig. 5 a vertical section illustrating another form of smoothing roller.

The materials forming the body of the composition and including fibre or hemp are fed into a trough or the like 1, with petrifying agent and thoroughly puddled together, with water if necessary, and then removed and delivered between one or more sets of mixing rollers 2, 3, arranged either one alongside the other as illustrated or one above the other. These rollers have radial spikes 4, the spikes of one roller passing between the spikes of the other roller and roller 3 is geared to revolve more rapidly than roller 2 which has the effect of mixing thoroughly the composition and particularly the fibre while both rollers act to feed forward the composition.

By means of any suitable elevator 14, consisting for instance of idle rollers 15, the material is delivered between one or more sets of rollers 5, 5. rotated in opposite directions and at the same speed, the roller 6 being of much greater diameter than roller 5. These rollers determine the thickness of the sheets and besides feeding the composition forward the greater circumference of roller 6 operates to polish one surface of the composition.

For the same purpose the upper rollers 6ª

(Fig. 5) may be provided with a series of radially projecting spring steel curved wipers 11, which in contacting with the composition trowels same and produces a smooth surface. The diametric length between the ends of opposite wipers is greater than the diameter of roller 5 or alternatively the roller 6ª is rotated more rapidly than roller 5. Furthermore, roller 6 or 6ª is set obliquely to roller 5 in order to obviate transverse ridges being formed across the composition.

If the rollers 2, 3, are in vertical alignment or raised above the roller 5 the elevator is unnecessary in which case the material simply passes over idle rollers similar to rollers 15.

The composition passes over idle rollers 7 and then along a metal plate 8 laid on a bench 9 and when the plate receives the desired length of composition for a sheet said length is cut off and the plate is removed and replaced by another. The plate with the plastic sheet is then placed on a table 10 which is heated. For the latter purpose the table top may be hollow and steam heated or jacketed or placed over an oven or the table top may be electrically heated. The sheet by either of these means is rapidly dried and is ready for use or it may then receive surface coats of cement or plaster of Paris if desired.

Many articles, especially for building purposes, may be manufactured by means of moulds from this composition such as tiles, slabs for wall building, bricks and mouldings such as cornices, troughs and pipes and if desired such moulded articles may have metal or other reinforcements which are placed in the moulds with the composition.

I claim:—

1. A cementitious sheet, slab, and the like, comprising a mixture of earthy material, slimes from mines or creeks, water, a long vegetable fibre as reinforcement, a petrifying agent and a heavy metal oxide hardener.

2. An improved cementitious sheet, slab and the like, comprising a mixture of earthy material, water, fibre, silicate of soda and an iron oxide from one to ten percent.

3. An improved cementitious sheet or slab having a body comprising a mixture of earthy material, water, fibre and a petrifying agent, and an outside surface of hydraulic cement.

4. An improved cementitious slab or sheet having a body comprising a mixture of earthy material, water, fibre and a petrifying agent, an outside surface of hydraulic cement and an inside finish coat of plaster of Paris.

5. An improved cementitious sheet or slab, comprising a body composed of a mixture of clay, slimes, hemp fibre and silicate of soda, and a water-proof coating.

6. An improved cementitious sheet or slab, comprising a body composed of a mixture of clay, slimes, hemp fibre and silicate of soda, a waterproof coating and an outer surface of hydraulic cement.

7. An improved cementitious sheet or slab, comprising a body composed of a clay, chalk, slimes, long vegetable fibre, silicate of soda, calcium chloride and iron oxide, having an outer cement coating.

8. An improved cementitious sheet or slab having a body comprising a clay, chalk, slimes, long vegetable fibre, silicate of soda, calcium chloride and iron oxide, having an outer cement coating and an inner finishing coat of plaster of Paris.

9. An improved cementitious sheet or slab having a body comprising a clay, chalk, slimes, long vegetable fibre, silicate of soda, calcium chloride and iron oxide, having a waterproof coating and an outer coating of cement.

10. An improved cementitious sheet or slab having a body comprising a clay, chalk, slimes, long vegetable fibre, silicate or soda, calcium chloride and iron oxide, having a waterproof coating an outer coating of cement and an inner finishing coat of plaster of Paris.

Dated this 9th day of August, 1922.

WILLIAM DUNSTAN.